United States Patent [19]

Ross et al.

[11] Patent Number: 4,479,167
[45] Date of Patent: Oct. 23, 1984

[54] ELECTROLYTIC CAPACITOR

[75] Inventors: Sidney D. Ross, Williamstown; Manuel Finkelstein, North Adams, both of Mass.

[73] Assignee: Sprague Electric Company, North Adams, Mass.

[21] Appl. No.: 519,456

[22] Filed: Aug. 1, 1983

[51] Int. Cl.$^3$ ............................................. H01G 9/00
[52] U.S. Cl. ................................... 361/433; 252/62.2
[58] Field of Search ........................ 252/62.2; 361/433

[56] References Cited

U.S. PATENT DOCUMENTS

| 3,539,881 | 11/1970 | Anderson | 317/230 |
| 3,670,212 | 6/1972 | Anderson | 317/230 |
| 3,812,038 | 5/1974 | Anderson | 252/62.2 |

FOREIGN PATENT DOCUMENTS

| 1052825 | 12/1966 | United Kingdom . |
| 1445894 | 8/1976 | United Kingdom ............ 252/62.2 |
| 1526878 | 10/1978 | United Kingdom . |

Primary Examiner—John F. Niebling

[57] ABSTRACT

An aluminum electrolytic capacitor contains as electrolyte 79-95 wt. % of an azeotrope of acetic or propionic acid and triethylamine or tri-n-propylamine, 5-20 wt. % water, and up to 1 wt. % phosphoric acid.

6 Claims, 2 Drawing Figures

ELECTROLYTIC CAPACITOR

BACKGROUND OF THE INVENTION

This invention relates to an aluminum electrolytic capacitor containing as electrolyte 79-95 wt. % of an azeotrope of acetic or propionic acid and triethylamine or tri-n-propylamine, 5-20 wt. % water, and up to 1 wt. % phosphoric acid. The electrolyte has a low enough resistivity to make it suitable for low-voltage capacitors.

Azeotrope electrolytes used in 25-60 V electrolytic capacitors have low volatility, good low temperature properties, and good shelf life. The azeotropes have been used with and without other solutes or other solvents. Generally, these electrolytes have not contained any additional water other than that introduced inadvertently.

There is a current demand for 10 V or lower capacitors. The electrolytes for these capacitors should have a resistivity below 200 Ω-cm and preferably less than 150 Ω-cm. It had been shown that conductive solutes, e.g., nitrates, lowered resistivity; however, nitrates are not compatible with aluminum foil so highly conductive organic solutes were added to the azeotropes. The results were highly disappointing, and in one case a violent reaction occurred. It had also been shown that the azeotropes could be used with capacitor solvents. When the azeotropes were mixed with low resistivity, polar solvents, the results were again disappointing.

SUMMARY OF THE INVENTION

It is a feature of this invention to provide capacitors containing an azeotrope of acetic or propionic acid and triethylamine or tri-n-propylamine plus 5-20 wt. % water and up to 1 wt. % phosphoric acid. The resulting electrolyte has low resistivity suitable for 0-150 V capacitors.

Because of statements describing the undesirability of the presence of water or no more than a small amount of water, it was surprising that the relatively large amounts of water used not only reduced electrolyte resistivity but also gave a stable electrolyte. The polarity of water does not seem to be the reason for these results as when a more polar solvent, N-methylpropionamide, was used, these results were not obtained. Thus, it is not clear why water gave the reduced resistivity when other polar solvents and conducting solutes did not.

DESCRIPTION OF THE PREFERRED EMBODIMENTS

Figure 1:
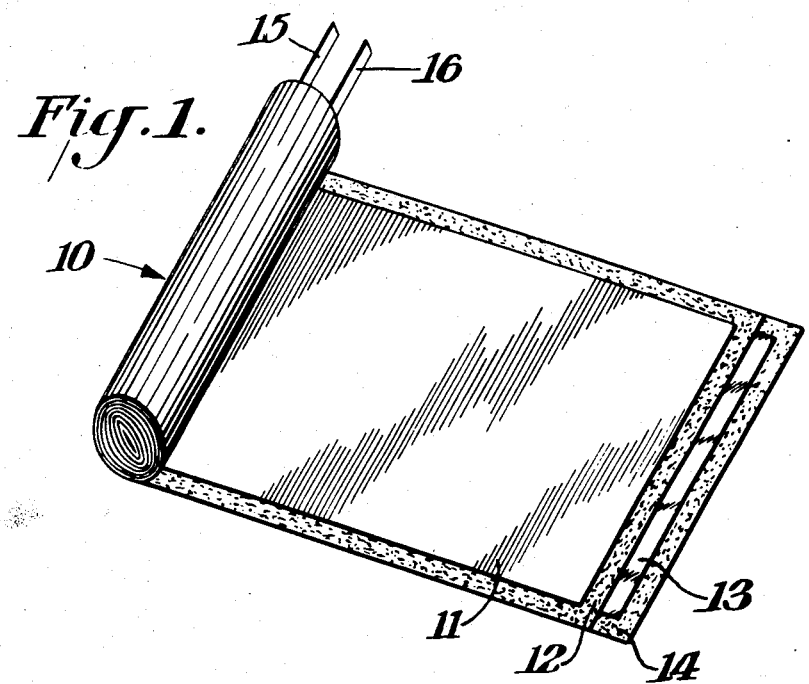
FIG. 1 shows a capacitor section partially unrolled.

An aluminum electrolytic capacitor section 10 has an anode foil 11 bearing a barrier layer dielectric oxide on its surface and a cathode foil 13, which may also bear a dielectric oxide, contiguously wound with interleaved spacer materials 12 and 14, e.g., paper. Electrode tab 15 is connected to anode foil 11, and electrode tab 16 is connected to cathode foil 13.

Figure 2:
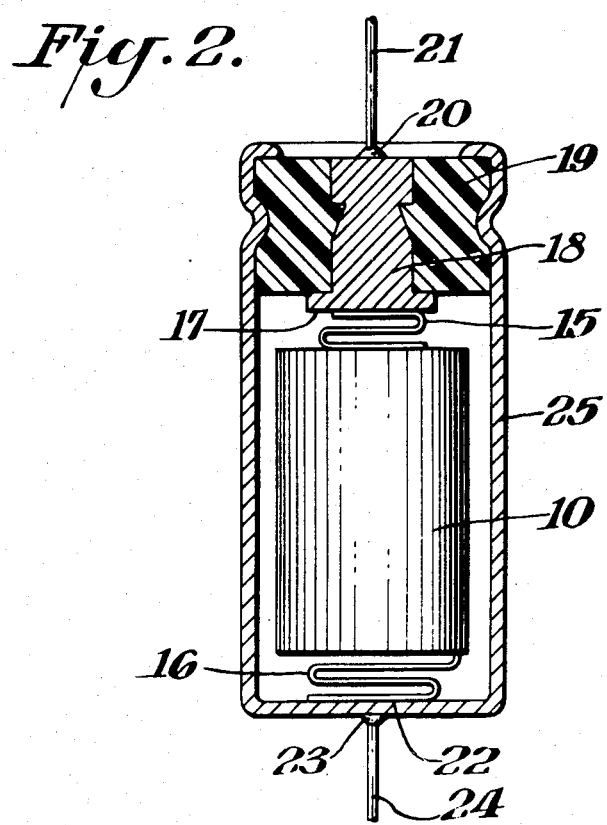
FIG. 2 is a cross-section of a capacitor.

As shown in FIG. 2, section 10 is placed in can 25. Electrode tab 15 is connected to terminal 18 which extends through sealing bung 19. A lead 21 is attached to terminal 18 preferably via weld 20. Electrode tab 16 is attached at 22, preferably by welding, to the inside of can 25 at its bottom. External lead 24 is attached to the exterior of can 25 at its bottom preferably via weld 23. Section 10 is impregnated by the electrolyte of the present invention (not shown).

The electrolyte of the present invention is an azeotrope of acetic or propionic acid and triethyl or tri-n-propylamine plus 5-20 wt. % water. Up to 1 wt. % phosphoric acid is also present to increase the anodization (formation rate) to between approximately 20-25 V/min. If gassing is suspected, a depolarizer may be added.

The molar ratio of acid: amine in the azeotrope at atmospheric pressure is 3.8±0.1 and corresponds to a 69-70 wt. % acetic acid and 31-30 wt. % triethylamine azeotrope and to a 66 wt. % propionic acid and 34 wt. % tri-n-propylamine azeotrope distilled at atmospheric pressure.

EXAMPLE 1

In the table below, room-temperature (25° C.) resistivity of ohm-cm is presented for various azeotrope-water mixtures to show the effect of water.

TABLE 1

| Volume % azeotrope | Volume % water | Resistivity Acetic acid-triethylamine | Resistivity Propionic acid-tri-n-propylamine |
| --- | --- | --- | --- |
| 100 | 0 | 228 | 1090 |
| 95 | 5 | — | 528 |
| 91 | 9 | 137 | — |
| 90 | 10 | — | 318 |
| 87 | 13 | 117 | — |
| 85 | 15 | — | 240 |
| 83 | 17 | 103 | — |
| 80 | 20 | — | 178 |

EXAMPLE 2

This example shows the effect of the addition of phosphoric acid on maximum formation voltage (Vmax) in volts and on the rate to form to 200 V in V/min. Formations were carried out at constant current, 85° C., and 1 mA/sq.cm. of foil. The azeotrope is acetic acid-triethylamine.

TABLE 2

| Weight Percent | | | | |
| --- | --- | --- | --- | --- |
| Water | 5 | 10 | 15 | 20 |
| Azeotrope | 95 | 90 | 85 | 80 |
| Resistivity | 158 | 128 | 106 | 87 |
| V max. | 268 | 318 | 316 | 235 |
| V/min. | 13.6 | 9.5 | 7.3 | 5.3 |
| Water | 5 | 10 | 15 | 20 |
| Azeotrope | 94.5 | 89.5 | 84.5 | 79.5 |
| H$_3$PO$_4$ (86%) | 0.5 | 0.5 | 0.5 | 0.5 |
| Resistivity | 168 | 127 | 111 | 89 |
| V max. | 350 | 375 | 275 | 280 |
| V/min. | 20.0 | 22.7 | 23.0 | 22.5 |

Values for the propionic acid-tri-n-propylamine azeotrope containing 5 wt. % water and 0.5 wt. % phosphoric acid were 568 Ω-cm and a V max. of 250 V; for the mixture containing 15 wt. % water and 0.5 wt. % phosphoric acid, the resistivity was 245 Ω-cm and V max., 290 V.

While the addition of phosphoric acid increased resistivity somewhat, it definitely increased the rate of formation to acceptable levels.

EXAMPLE 3

A formulation containing 92 wt. % acetic acid-triethylamine azeotrope, 7 wt. % water, and 0.8 wt. % phosphoric acid (86%) had a V max. of 385 V. The overall formation rate was 18.0 V/min. with a rate of 25.4 V/min. to 150 V. Its low-temperature resistivity properties are shown below.

TABLE 3

| Temperature | 25° C. | −25° C. | −40° C. | −56° C. |
|---|---|---|---|---|
| Resistivity, Ω-cm | 135 | 1990 | 8330 | 69,600 |

Two depolarizers were also evaluated in this formulation at the expense of the azeotrope, e.g., 87 wt. % azeotrope and 5 wt. % depolarizer with other ingredients remaining the same. When 1-nitropropane was used as depolarizer, the formulation had a 25° C. resistivity of 140 Ω-cm and a V max. of 405 V at 85° C. The corresponding values when p-nitrobenzoic acid was used were 169 Ω-cm and 380 V.

EXAMPLE 4

Two sets of 6.3 V aluminum capacitors were made containing the electrolyte of Example 3 (no depolarizer) and subjected to life tests. Results at 2000 hrs. for testing at 85° C. and at 500 hrs. at 105° C. are given below. Capacitance is given in microfarads (μF), capacitance loss in percent (%ΔC), dissipation factor (df) in percent, change in dissipation factor in percent (%Δdf), and median leakage current in microamperes (μA). The weight losses shown below for the 85° C. tests provide an estimate of capacitor life, since loss of approximately 50% of the electrolyte solvent ends the useful life of the capacitor. In addition, equivalent series resistance (ESR) in milliohms and change in ESR in percent (%ΔESR) were measured in the 105° C. tests. The first four lines, 0 to 2000 hrs., are 85° C. test data, and the last two lines, 0 and 500 hrs., are 105° C. test data for another construction.

TABLE 4

| hrs. | Cap. | % ΔC | % df | % Δdf | μA | % wt. loss | ESR | % ΔESR |
|---|---|---|---|---|---|---|---|---|
| 0 | 9256 | — | 33.7 | — | 88 | — | — | — |
| 500 | 8702 | 6.0 | 30.3 | −10.1 | 4.6 | 0.06 | — | — |
| 1000 | 8619 | 6.9 | 27.3 | −19.0 | 9.2 | 0.07 | — | — |
| 2000 | 8429 | 8.9 | 26.5 | −21.4 | 9.0 | 0.13 | — | — |
| 0 | 5700 | — | 12.8 | — | 12.0 | — | 29.8 | — |
| 500 | 4820 | 15 | 11.2 | −12.0 | 6.7 | — | 31.5 | +5.7 |

Both sets of capacitors show good electrical properties on life testing. However, the results are not completely comparable as different constructions were used with different spacers and completely different closures.

What is claimed is:

1. An electrolytic capacitor comprising a pair of aluminum foil electrodes, at least one bearing a barrier layer dielectric oxide on its surface, contiguously wound with interleaved spacer material and in contact with an electrolyte consisting essentially of 79–95 wt. % of an azeotrope of an acid and an organic amine, 5–20 wt. % water, 0–5 wt. % of a depolarizer, and up to 1 wt. % phosphoric acid, said acid being selected from acetic acid and propionic acid and said amine being selected from triethylamine and tri-n-propylamine.

2. A capacitor according to claim 1 wherein said azeotrope is derived from propionic acid and tri-n-propylamine.

3. A capacitor according to claim 1 wherein said azeotrope is derived from acetic acid and triethylamine.

4. A capacitor according to claim 3 wherein said electrolyte contains 92 wt. % acetic acid-triethylamine azeotrope, 7 wt. % water, and 1 wt. % phosphoric acid.

5. A capacitor according to claim 1 wherein said depolarizer is selected from 1-nitropropane and p-nitrobenzoic acid.

6. A capacitor according to claim 5 wherein said electrolyte contains 87 wt. % acetic acid-triethylamine azeotrope, 7 wt. % water, 1 wt. % phosphoric acid, and 5 wt. % depolarizer.

* * * * *